(12) United States Patent
Shiota

(10) Patent No.: US 6,210,643 B1
(45) Date of Patent: Apr. 3, 2001

(54) OZONIZER

(75) Inventor: Hirokazu Shiota, 5-12, Minami Aouyama 5-chome, Minato-ku, Tokyo 107-0062 (JP)

(73) Assignees: Hirokazu Shiota; Jiro Miyamoto

( * ) Notice: Subject to any disclaimer, the term of this patent is extended or adjusted under 35 U.S.C. 154(b) by 0 days.

(21) Appl. No.: 09/451,165

(22) Filed: Nov. 30, 1999

(30) Foreign Application Priority Data

Jul. 12, 1998 (JP) .................................................. 10-346769

(51) Int. Cl.⁷ ................................ B01J 19/08; C25B 1/00
(52) U.S. Cl. ...................... 422/186.07; 204/258; 204/283
(58) Field of Search ........................ 422/186.07; 204/258, 204/283

(56) References Cited

FOREIGN PATENT DOCUMENTS

| 06306668 | 11/1994 | (JP) . |
| 10277551 | 9/1998 | (JP) . |
| 10324988 | 12/1998 | (JP) . |

*Primary Examiner*—Kishop Mayekar
(74) *Attorney, Agent, or Firm*—Bachman & LaPointe, P.C.

(57) ABSTRACT

There is provided an ozonizer with an ozonizer element which has a columnar shaft body, a positive electrode of a platinum net plate which is fitted around an outer surface of the columnar shaft body, an ion exchange membrane fitted around the positive electrode, and a negative electrode of a metal net fitted around the ion exchange membrane. The positive electrode is intermittently wound around the columnar shaft body with a predetermined axial interval or otherwise an intermittent insulator is provided in an axial direction between the positive electrode and the negative electrode. The ozonizer has a tubular passage for permitting water to flow therethrough and housing therein the ozonizer element such that an axis of the ozonizer lies in the flowing direction of the water. Further the ozonizer has a device for applying DC voltage between the positive electrode and the negative electrode so that a discharge portion and non-discharge portion are alternately located in the water flowing direction.

6 Claims, 6 Drawing Sheets

OZONIZER

BACKGROUND OF THE INVENTION

1. Field of the Invention

The present invention relates to an ozonizer and more particularly to an ozonizer for obtaining ozonized water by means of an electrolysis (electrolytic process) to obtain ozone-dissolved water in which ozone is dissolved.

2. Prior Art

As conventional methods of obtaining ozonized water, a discharge method and an electrolytic method are generally known, wherein the former method has steps of an oxygen gas (or, in some cases an air) is passed through silent discharge electrolysis to produce an ozone gas of a high concentration and subjecting this ozone gas to be contacted with water to dissolve the ozone in the water. However, the discharge method described above requires a large scale equipment and, moreover, involves some dangers in leakage of ozone gas because an ozone gas of a high concentration is once generated before it is dissolved in the water. Further, there are cases that undissolved ozone of a vapor phase is remained in the water and then discharged to the atmosphere, with the result of problems of malodor or offensive odor of ozone.

With respect to the ozonizer of the latter method, that is, electrolytic method, water is electrolyzed and, since ozone is mixed with an oxygen which is generated at an anode (positive) electrode side, the ozone is directly dissolved in the water of the electrolysis. In the conventional electrolytic ozonizer, a thin ion exchange membrane is disposed between the two electrodes for electrolytic process to effectuate the electrolytic process, so that an ozone concentration becomes high. In this method, it is known that an application of a platinum, which inherently has a catalytic effect, as an anode electrode will increase an efficiency of ozone generation.

Further, it is known that if the electrodes for the electrolytic process are formed into a wire netting (or wire screen) structure, a further efficient electrolytic operation is expected and, therefore, platinum electrodes of a wire netting structure have been disposed on both sides of a plate-like ion exchange membrane in an overlapping relation so that the water flows along the anode (positive) electrode side such that the water contacts both the anode electrode and an exposed surface of the ion exchange membrane. This method is known to be the most efficient method of the ozonizer.

In the ozonizer of the electrolytic process described above, the generated ozone is immediately dissolved in the water and, therefore, there is less danger of ozone leakage and, in addition, this type of ozonizer has an advantage that it can be formed in a smaller scale. However, there are other problems that it requires a relatively large ion exchange membrane having an area of 30 cm$^2$ or more and still has a problem of a large-scale configuration, and requires an extremely high dimensional accuracy in production because, unless the electrode is constantly pressure-held on the ion exchange membrane, a constant efficiency of ozone generation is not realized. In other words, in the conventional ozonizer of a planar type, an accurate and high machinability and preparation of special materials of plastic deformation for electrodes or an electric collector are required for the purpose of obtaining a constant pressure-contact of the electrodes against the ion exchange membrane.

Further, when the electrolytic ozonizer is used, fine bubble-like ozone is suspended and remained in the ozone water, and the ozone water immediately after obtained has malodor of ozone and, therefore, there is a problem that such an electrolytic ozonizer will not suitable for use in a closed room such as a clear room, a medical consulting room, etc.

SUMMARY OF THE INVENTION

Accordingly, in view of the problems and situations of the conventional ozonizers, an object of the present invention is to provide a new ozonizer, which permits a highly efficient ozone generation.

A further object of the present invention is to provide a new ozonizer, which is a small-sized and can be produced readily without a substantial labor and difficulty.

Another object of the present invention is to provide a new ozonizer, which permits an effective dissolution of the fine bubbles of ozone, which are suspended in the ozone water.

According to a first aspect of the present invention, there is provided an ozonizer comprising:
  (1) an ozonizer element, the ozonizer element having:
    a columnar shaft body,
    a positive electrode of a platinum net pressure-wounded around an outer surface of the columnar shaft body,
    an ion exchange membrane pressure-wounded around the positive electrode,
    a negative electrode of a metal net pressure-wounded around the ion exchange membrane,
    wherein the positive electrode is wound around the columnar shaft body to thereby form the ozonizer element,
  (2) a tubular passage for permitting water to flow therethrough and housing therein the ozonizer element in such a manner that an axis of the ozonizer lies in the flowing direction of the water, and
  (3) means for applying DC electric voltage between the positive electrode and the negative electrode so that a discharge portion and non-discharge portion are alternately disposed in the flowing direction of the water.

By the structure described above, the water flowing in the tubular passage is electrolyzed at the portion of the ozonizer element to generate hydrogen, oxygen and ozone. Ozone, which is soluble in water, is dissolved immediately in the water so that ozone water is obtained as similar as in the conventional planar type ozonizer of an electrolytic method.

In the present invention, since the ozonizer element is formed not in the form of planar type as in the conventional ozonizer but in the form of a cylindrical or columnar shape, the entire structure can be made compact and in a smaller size, and the ozonizer element in the columnar shape is formed by simply winding the positive electrode, the ion exchange membrane, and negative electrode, in turn, and therefore these elements can be fixed easily in position by a natural pressure-contact with each other. In this connection, a fastening band is used to fasten the wound layers of the elements and, in the illustrated embodiment, a string made of Teflon is used to wind around the outermost surface to fasten the wound layers of the ozonizer element.

According to a second aspect of the present invention, there is provided an ozonizer comprising:
  (1) an ozonizer element, the ozonizer element having:
    a columnar shaft body having a thin groove extending from one end thereof to the other end,
    a positive electrode of a platinum net plate pressure-wound around an outer surface of the columnar shaft body, an ion exchange membrane pressure-wound around the positive electrode, a negative electrode of a metal net pressure-wound around the ion exchange membrane to thereby form the ozonizer element, (2) a tubular passage for permitting water to flow therethrough and housing therein the ozonizer element in such a manner that an outer surface of the positive electrode is contacted with an inner surface of the tubular passage, or otherwise, in such a manner that the ozonizer element is concentrically suspended between the negative electrode and the tubular passage by means of a holding ring disposed at an upstream of the tubular passage, and (3) means for applying DC electric voltage between the positive electrode and the negative electrode.

In the second aspect of the invention described above, a flow rate of water on the negative electrode side is limited to an amount of water crossing in the planar direction of the metal mesh plate and, on the other hand, the water on the positive electrode side flows not only across in the planar direction of the mesh plate but also through the groove and, therefore, difference of water flow rate can be achieved between the positive electrode side and the negative electrode side.

According to a third aspect of the present invention, there is provided an ozonizer comprising:

(1) an ozonizer element, the ozonizer element having:

a columnar shaft body having a thin spiral groove extending longitudinally from one end thereof to the other end, and a linear thin groove extending longitudinally from one end thereof to the other end, a positive electrode of a platinum net plate pressure-wound around an outer surface of the columnar shaft body, an ion exchange membrane pressure-wound around the positive electrode, a negative electrode of a metal net pressure-wound around the ion exchange membrane to thereby form the ozonizer element, (2) a tubular passage for permitting water to flow therethrough and housing therein the ozonizer element in such a manner that an outer surface of the positive electrode is contacted with an inner surface of the tubular passage, or otherwise, in such a manner that the ozonizer element is concentrically suspended between the negative electrode and the tubular passage by means of a holding ring disposed at an upstream of the tubular passage, and (3) means for applying DC electric voltage between the positive electrode and the negative electrode.

In the third aspect of the invention described above, the columnar shaft body has a spiral thin groove and a linear thin groove and, therefore, the water flowing between the columnar shaft body and the ion exchange membrane is directed to flow across the spiral thin groove and, consequently, a great number of swirls can be generated effectively.

According to a fourth aspect of the present invention, there is provided an ozonizer comprising:

(1) an ozonizer element, the ozonizer element having:

a columnar shaft body, a positive electrode of a platinum net pressure-wound around an outer surface of the columnar shaft body, an ion exchange membrane pressure-wound around the positive electrode, a negative electrode of a metal net pressure-wound around the ion exchange membrane, wherein the positive electrode is intermittently wound around the columnar shaft body with a predetermined axial interval or otherwise an intermittent insulation is provided in an axial direction between the positive electrode and the negative electrode to thereby form the ozonizer element, (2) a tubular passage for permitting water to flow therethrough and housing therein the ozonizer element in such a manner that an axis of the ozonizer lies in the flowing direction of the water, and (3) means for applying DC electric voltage between the positive electrode and the negative electrode so that a discharge portion and non-discharge portion are alternately disposed in the flowing direction of the water.

By the structure described above, the water flowing in the tubular passage is electrolyzed at the portion of the ozonizer element to generate hydrogen, oxygen and ozone. Ozone, which is soluble in water, is dissolved immediately in the water so that ozone water is obtained as similar as in the conventional planar type ozonizer of an electrolytic method.

In the present invention, since the ozonizer element is formed not in the form of planar type as in the conventional ozonizer but in the form of a cylindrical or columnar shape, the entire structure can be made compact and in a smaller size, and the ozonizer element in the columnar shape is formed by simply winding the positive electrode, the ion exchange membrane, and negative electrode, in turn, and therefore these elements can be fixed easily in position by a natural pressure-contact with each other. In this connection, a fastening band is used to fasten the wound layers of the elements and, in the illustrated embodiment, a string made of Teflon is used to wind around the outermost surface to fasten the wound layers of the ozonizer element.

Further, in the fourth aspect of the present invention, since the discharge portion and non-discharge portion are alternately disposed in the flowing direction of the water, an ozone generation portion and ozone dissolution portion are alternately combined in plural locations and, therefore, an efficient dissolution can be obtained.

In the fifth aspect of the invention, the columnar shaft body has large diameter portions and small diameter portion in an alternate configuration and a thin spiral groove is provided on the large diameter portions so that the thin spiral groove extends in the lengthwise direction from one end to the other. On the large diameter portion of the columnar shaft body, the positive electrode is wound and further the ion exchange membrane is wound on the outer surface of the positive electrode, and further, the negative electrode of a metal net structure is wound on the surface of the thus formed ion exchange membrane, so that each of the wound layers is pressure-contacted to the adjacent one to form the ozonizer element. The ozonizer element is placed in the tubular passage such that an axis is located in the flowing or passing direction of the water, and a DC electric voltage is applied between the positive electrode and the negative electrode so that discharge portions and the non-discharge portions are positioned alternately in the direction of the water passage.

Therefore, in the fifth aspect of the invention in which the thin spiral groove is disposed on the surface of the large diameter portions of the columnar shaft body, water as a raw material is forced to flow in a complex posture so that ozone generated at one place is immediately moved to the other places and consequently increase an efficiency of ozone generation.

Further, the water passage formed between the columnar shaft body and the ion exchange membrane is dilated or widened at the small diameter portion to provide changes in sectional areas of the passage so that a complex flow of the water is achieved to thereby effectively dissolve the ozone bubbles.

In the sixth aspect of the invention, the large diameter portions and the small diameter portions are alternately provided in the axial direction of the columnar haft body, and a spiral thin groove is provided on the surface of the large diameter portions so that the spiral thin groove extends longitudinally from one side of the columnar shaft body to the other side. The positive electrodes are wound on the large diameter portions and the ion exchange membrane is wound on the outer surface of the positive electrodes, and further the metal negative electrode is wound on the outer surface of the ion exchange membrane such that these elements in layers are pressure-contacted with the adjacent ones. Thus, a predetermined ozonizer element is performed. The ozonizer element is housed in the tubular passage so that water passed through the ozonizer element. In the tubular passage, the ozonizer element is disposed such that the outer surface of the positive electrode is contacted with the inner surface of the tubular passage, or otherwise, the ozonizer element is concentrically held by a holder ring which is disposed at an upstream portion of the tubular passage between the negative electrode and the tubular passage. Between the positive electrodes and the negative electrode, a DC electric voltage is applied to that discharge portions and non-discharge portions are located alternately in the direction of the water flow.

Thus, in the sixth aspect of the invention, at the negative electrode side, an amount of the water is limited such that the water passes or flows laterally in the direction of a surface of the metal net. At the positive electrode side, the water flows laterally in the direction of the surface of the metal net and, at the same time, through the spiral thin groove. Thus, an effective difference in the flow rate can be provided.

PREFERRED EMBODIMENTS OF THE INVENTION

Figure 1:
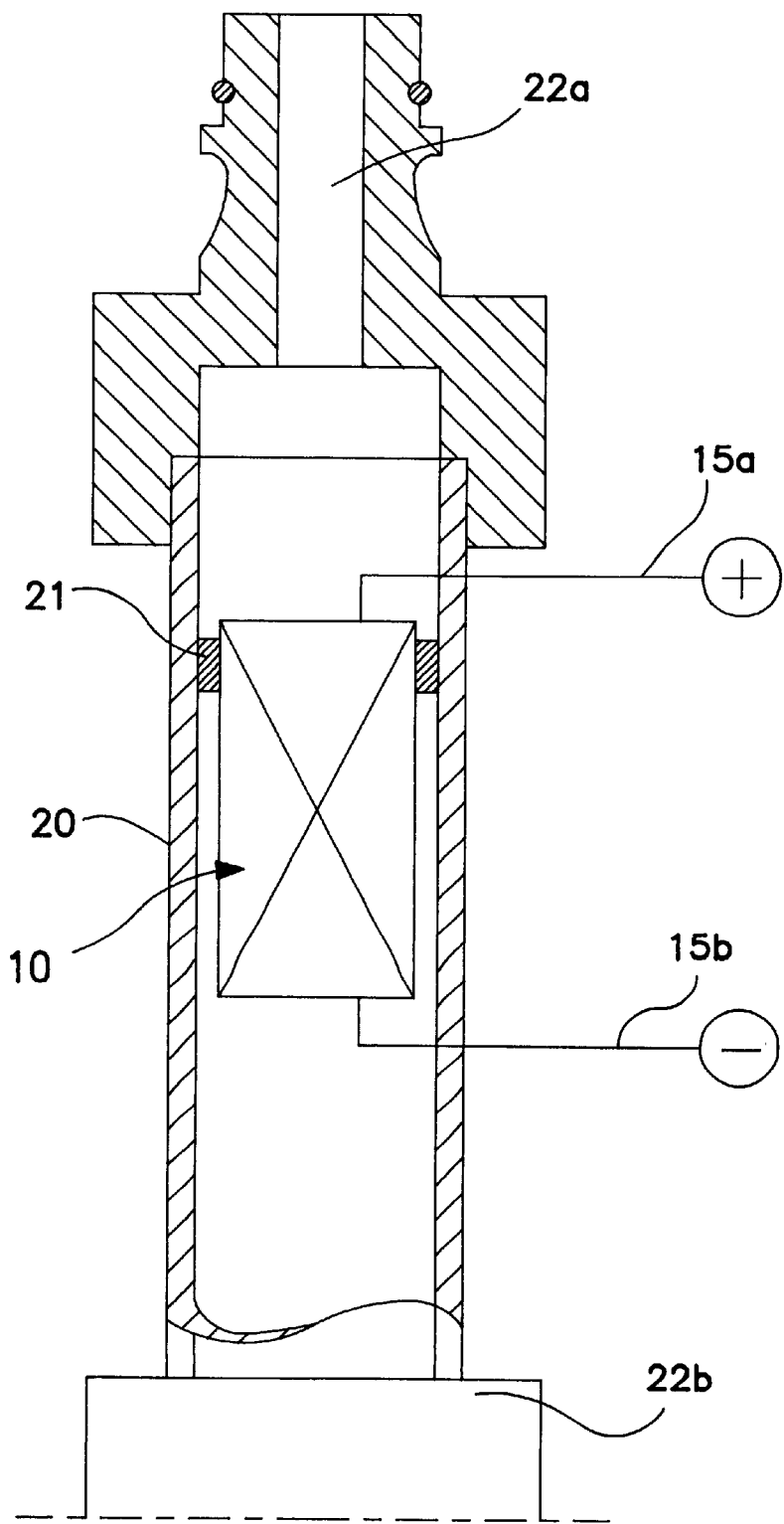
FIG. 1 is a front view, longitudinally partly sectioned, of an ozonizer according to the present invention.
Figure 2:
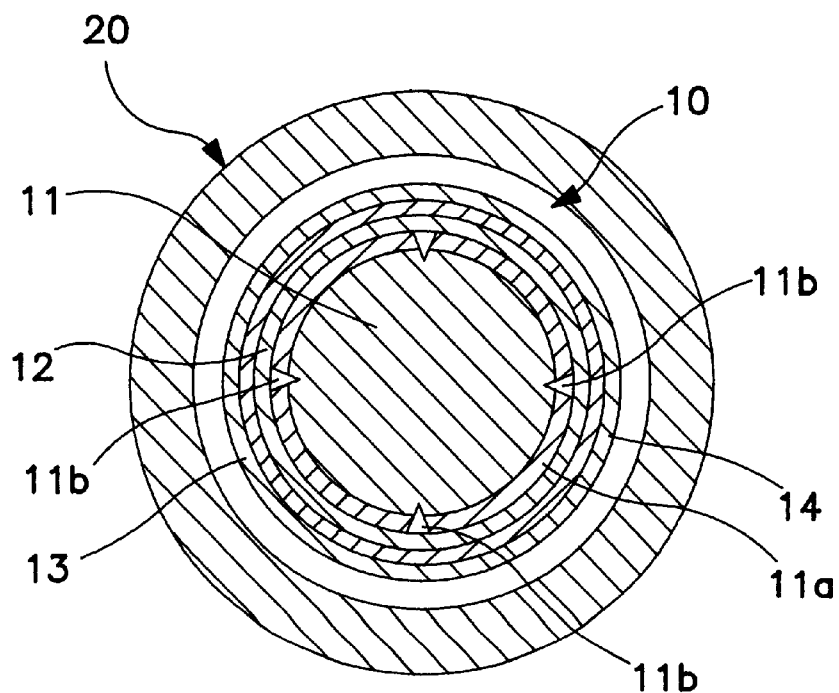
FIG. 2 is an enlarged sectional view of the ozonizer shown in FIG. 1.
Figure 3:
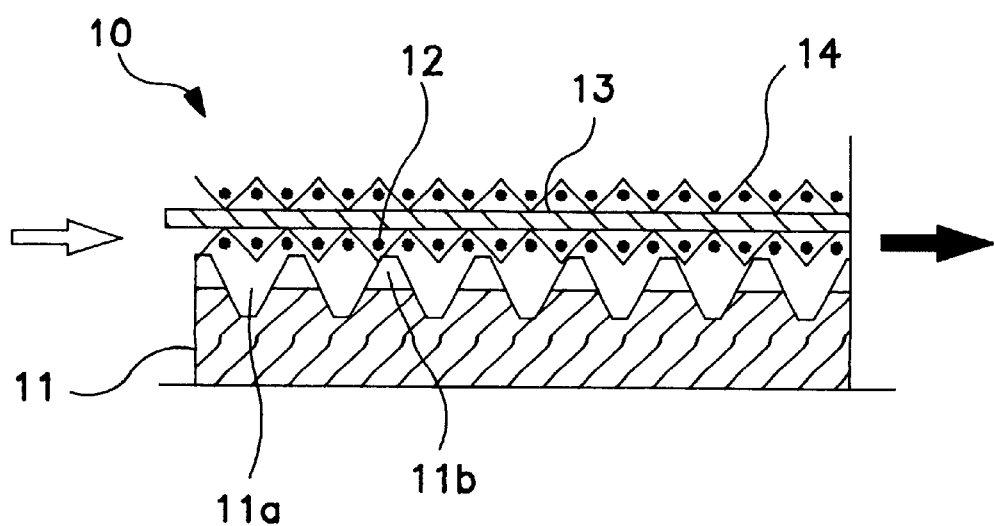
FIG. 3 is an enlarged sectional view of an electrolytic portion.

A typical example of the feature according to the present invention will be first described as set forth below.

EXAMPLE 1

A cylindrical or columnar shaft body 11 is made of Teflon resin having a structure of a diameter of 10 mm, a length of 30 mm and has a small (or reduced) diameter portions 11*b* having a groove 11*a* in a spiral configuration and groove 11*b* of a V-shape having a depth of about 1.0 mm forming as a part of a equilateral triangle, and six grooves of such structure are provided. A positive electrode 12 is made of platinum net plate having 55 mesh. An ion exchange membrane 13 made of Naphion Membrane (No. 450, thickness of 0.15 mm, made by Du Pont) and a negative electrode 14 made of a platinum mesh as similar as the positive electrode 12 were used to form an ozonizer element 10. The thus formed ozonizer element 10 was placed in a tubular passage 20 of nylon resin having a thickness of 2 mm and an outer diameter of 20 mm, and a hold ring 21 of a nylon resin having an outer diameter of 16 mm, an inner diameter of about 11 mm and a width of 5 mm was disposed between an outer circumference of an upstream side of the ozonizer element 10 and the inner circumferential surface of the tubular passage 20. Each of the positive electrodes 12 and the negative electrode 14 were connected to an power source (not shown) through lead lines 15*a,* 15*b,* and DC power of 12V was applied therebetween, so that an electric current of about 10 Am was obtained during the passage of the water. When a water flow was controlled to be 1.0 liter per minute in the tubular passage 20, an ozone concentration of the water at the outlet was found to be 7 to 10 ppm. When the water flow is controlled to be 2.5 liter per minute, the ozone concentration of the ozone water was about 5 ppm, and when the water flow was 5.0 liter per minute, the ozone concentration was about 2.5 ppm. It was found that the ozone water having an ozone concentration of 5 ppm felt no ozone odor.

Now, preferred embodiments of the present invention will be described with reference to the drawings, in which the ozonizer 10 constitute a substantial or main portion of the ozonizer of the inventing. The ozonizer 10 has at its central portion a cylindrical or columnar shaft body 11, on an outer surface of which there are provided, in turn, a positive electrode 12 of a platinum mesh plate, an ion exchange membrane 13 on the positive electrode 12, and a negative electrode 14 of a mesh plate on the ion exchange membrane 13 so that these layers 12, 13, 14 are closely wound or pressure-contacted with the adjacent ones.

In the illustrated embodiment, the columnar shaft body 11 is made of Teflon resin but other materials such as ceramics can be used as long as they have non-electric and anti-ozone characteristics. The positive electrode is made of a platinum mesh plate as known in the art, and it is generally understood that platinum has a catalyst function for enhancing efficiency of ozone generation.

Since the positive electrode 12 has a metal net or mesh plate structure of metal, it permits water not only to pass therethrough but also, if plates are superposed or laminated on both surfaces of the mesh plate and water is forced into the space between the laminated outer plates, the water will passes or flows in a complex manner through curved spaces by the strings of the mesh plate or net and passes in the planar direction of the mesh plate, which will be referred hereinafter to "planar direction" of the metal net or mesh plate. This flow of water will constitute a very complex stream of water and increase the degree or frequency of contact with ozone immediately after it is generated, and the generated ozone is immediately delivered to the other places to increase the efficiently of electrolytic process and ozone generation.

Further, in an electrolytic process by the use of the ion exchange membrane 13, an electrolytic action is most strongly effected the portion adjacent to the border between the portion where the electrodes are contacted with the ion exchange membrane 13 and the portion where the ion exchange membrane 13 is exposed to thereby provide a desirable generation of ozone. Thus, the use of the metal mesh plate increases the area or portions of the borders between the positive electrode 12 and the ion exchange membrane 13 and, therefore, it is understood to be the most desirable choice to use a mesh plate or net-like structure as the positive electrode.

As the ion exchange membrane 13 described above, Nafion membrane which is available in the market can be used, and this kind of ion exchange membrane 13 is solid but electrolytic, and the both electrolytic positive electrode 12 and the negative electrode 14 are piled on both surfaces of the ion exchange membrane 13 in layers. By this construction, these elements can be positioned nearer from each other and, consequently, a severe and hard electrolytic process (electrolyzing) at a lower voltage will be made possible.

In addition, as the negative electrode 14, a similar metal mesh plate is used in the embodiment of the invention and any materials will be used if they are anti-corrosive metals. It is known that platinum, gold, silver, etc. can be used for increasing ozone generation efficiency by their catalytic functions. If desired, platinum-plated titanium (Ti) mesh plate is practically preferred as being excellent in anti-corrosive properties and efficiency of ozone generation and, the platinum is not dissolved after a long time use and, therefore, it was found that this type of negative electrode can be used as similar as an electrode which is made substantially of platinum.

Although it has been known in the art that the positive electrode 12, the ion exchange membrane 13, and the negative electrode 14 can be used for an ozonizer, these elements in the present invention are used by winding the elements 12, 13, 14 in layers in a pressure-contact manner.

The positive electrode 12, the ion exchange membrane 13, and the negative electrode can be previously formed in a tubular shape and then these elements can be placed, in turn, on the outer surface of the columnar shaft body 11 in a press-contact fashion. However, since each of these elements are flexible and resilient, each of these elements are prepared in a planar configuration and then wound on the columnar body 11 and, in this case, it is preferred that a starting end and a finishing end of each of the elements are not superposed, although a small superposition was found to be still satisfactory without any remarkable reduction in efficiency.

As described above, the winding of the positive electrode 12, the ion exchange membrane 14, the negative electrode 14 and the insulating tape 16 in turn will provide a high grade of dimensional accuracy. The final winding layer of the negative electrode 14 are fixed at its both ends by a suitable method such as spot welding, blazing, suture, binding, knotting, etc.

Further, in the present invention, the ozonizer 10 is positioned in the tubular passage 20 through which water flows such that an axis of the ozonizer 10 lies on (or, in parallel with) the direction of the water flow, and DC power is applied between the positive electrode 12 and the negative electrode 14. The tubular passage 20 is made of a non-conductive material as nylon and the like and has an inlet 22a at its one end and an outlet 22b at its other end so that the water from the inlet 22a flows through the tubular passage 20 and discharged out of the outlet 22b.

Since the ozonizer element 10 has a configuration that the columnar shaft body 11 is positioned such that its axis is aligned with, or in other word, in parallel with, the flowing direction of water, the water flowing through the columnar shaft body 11 will flow between the met shaped positive electrode 12 and the net shaped negative electrode 14 such the water flows over metal wires which constitute the nets of the electrodes 12, 14 and changes its directions in a complex way to run in the planar direction. Accordingly, at the side of the positive electrode 12, oxygen and ozone gas are generated by an electrolytic function and these gasses are entrained into small swirls of water and the ozone is immediately dissolved to water to become ozone water. The oxygen gas which is generated together with the ozone gas has lower solubility to water than the ozone gas (that is, ten times different in henry coefficient) and, therefore, a substantial amount of the oxygen gas is suspended in the water as non-soluble bubbles and directed toward the outlet 22b.

On the other hand, on the side of he negative electrode 14, hydrogen gas is generated by an electrolytic process and directed in the form of air bubbles to the outlet 22b. Water passing through the positive electrode 12 and water passing through the negative electrode are mixed with each other at the downstream of the ozonizer element 10. However, it was found from the experiments that hydrogen generated on the side of the negative electrode 14 in the form of a gaseous phase is not reactive to ozone water, which is generated by dissolving ozone. However, a part of oxygen in the suspended gas phase and the ozone in the small amount of undissolved gas phase are partly reacted with hydrogen in a gas phase to return to water. In this reaction of the conventional ozonizer of the type described, the water passing across the positive electrode 12 and the water passing across the negative electrode 14 are separately taken out and, in this case, malodor is recognized in this water. By contrast, in the present invention, an ozone concentration is maintained at a predetermined level in the hydrogen-mixed water and no malodor is recognized at all.

In the second aspect of the invention (as defined in claim 2), the thin grooves 11a, 11b extending longitudinally from one end of the columnar shaft body 11 to the other end are provided, so that a predetermined amount of water can be passed without a substantial loss of water flow, the loss of water flow being caused by complex flowing direction due to the provision of the metal mesh plate. Thus, in the second aspect of the invention described above, the grooves 11a, 11b are provided.

In the illustrated configuration, two types of grooves are provided such that the groove 12a is a spiral groove formed around the columnar shaft body 11 and the groove 12b is a linear groove having a V-shape in cross section and extending parallel with an axis of the columnar shaft body 11, but if necessary either of these two types of grooves can be selectively formed. If it is required that a great amount of water is flown on the side of the positive electrode 12, a constant gap or space can be provided between the columnar shaft body 11 and the positive electrode 12 and, in this case, a predetermined amount of water can be obtained by provision of the thin grooves 11a 11b and, at the same time, the positive electrode 12 can be wound accurately.

The other structural features such as the press-contacted layered configuration of winding, on the columnar shaft body 11, the positive electrode 12 of a platinum mesh plate, the ion exchange membrane 13 and the negative electrode 14 of a metal mesh plate, in turn, are considered to be same as those of the first aspect of the invention which is defined in claim 1.

In addition, in the second aspect of the invention, the ozonizer element 10 is positioned in the tubular passage 20 such that the outer surface of the positive electrode 12 is contacted with the inner surface of the tubular passage 20, or alternatively, such that the holding ring 21 is provided at an upstream portion of the tubular passage 20 to hold the ozonizer element 10 concentrically between the negative electrode 14 and the tubular passage 20. In other words, even though grooves 11a, 11b are provided on the columnar shaft body 11, there is a problem that the gap can does not increase the amount of the water flowing across the positive electrode 12 if the gap is larger than expected, because the water from the inlet port 22a flows primarily across the negative electrode 14 rather than the positive electrode 12. Therefore, in the second aspect of the invention, the water which flows across the negative electrode 14 is limited to the water-flow in the planar direction of the negative electrode 14 so that the other gaps are closed by the inner circumference of the tubular passage 20 or otherwise by the holding ring 21, as described above, since substantially no water flow is required on the side of the negative electrode in view of obtaining an ozone water.

Accordingly, the water flow rate between the positive electrode 12 and the negative electrode 14 is determined by the size of a cross sectional area of the grooves 11a, 11b and, therefore, generated ozone is effectively dissolved in the predetermined amount of water. As similar as the first aspect of the invention, DC current is applied to the positive electrode 12 and the negative electrode 14.

In the third aspect of the present invention, both the spiral groove 11a and the linear grooves 11b are provided. The spiral groove 11a is located substantially perpendicular to the water-flow direction in the tubular passage 20 and, therefore, the water will flow crossing over the spirally formed groove 11a and produces swirls or vortexes as it crosses over the groove 11a. The thus formed swirls provides some improvements in efficiency by the following two reasons. First, since the swirls have an agitating effect, the ozone that is generated by an electrolytic process is efficiently dissolved in water. Second, when ozone and oxygen of a gas phase are generated by an electrolytic process, air bubbles are generated to obstruct the following electrolytic process. However, by moving away the bubbles and supplying fresh water to the place where electrolytic process is likely to be generated, a stable electrolytic operation can be continued.

Although the spiral groove 11a itself provides a remarkable effect for producing swirls, it will be difficult to maintain a constant flow rate of water because the spiral groove 11a has a relatively small area in cross section. Thus, in the third aspect of the invention, the linear grooves 11b, 11b . . . , are added for use in combination with the spiral groove 11a, so that a desired sectional area for the water flow is determined to permit the water to flow into and out of a cross point between the spiral groove 11a and the linear grooves 11b. Thus, a predetermined amount of water flow is obtained to thereby generate small swirls entirely and pass across the positive electrode 12.

In the present invention, if it is required to increase a volume of the ozone generation, it is desirable that a plurality of ozonizers are simply provided to a header in a parallel manner, and if an ozone concentration is to be increased, it is satisfied by merely providing the ozonizers coupled in a serial manner. In this connection, when two ozonizers in the specific example in the preferred embodiment of the invention were coupled in series, it was found that ozone concentration of the ozone water was 10+α(ppm) at a water flow rate of 2.5 liter per minute. Since a saturation concentration of ozone is 18 ppm at the condition of 20° C. and 1 atmospheric pressure, in case of the serial connection as described above, connection of two–four ozonizers would be a practically applicable range.

As described above, in the present invention, the ozonizer element 10 is composed of a tubular shaft body 11, a positive electrode 12 of a platinum mesh plate wound on the tubular shaft body 11, an ion exchange membrane 13 wound on the positive electrode 12, and a negative electrode 14 wound on the ion exchange membrane 13 such that the layers of these elements are press-contacted with the adjacent ones. Therefore, a desired ozonizer, which is simple and meets with the requirements of dimensional accuracy, can be obtained easily.

Further, in the present invention, ozone water (ozone-dissolved, oxygen-suspended water) passing across the positive electrode 12 and hydrogen-suspended water passing across the negative electrode 14 are not separated from each other when they are taken out and, accordingly, no structure or installment for such separation is required at all, with the result of achieving a favorable ozonizer of a compact structure. Although hydrogen of a gas phase is added to the ozone water, it will provide no effect on an ozone concentration of ozone water and, since the added ozone of the gas phase is reactive to the hydrogen, the ozone of a gas phase is not discharged out of the ozonizer of the present invention.

Further, in the second aspect of the invention, generated ozone is effectively dissolved in water without any loss because a water flow rate on the side of the positive electrode 12 is desirably obtained. Further, in the third aspect of the invention, a successful combination is made between the spiral groove 11a and the linear grooves 11b and, accordingly, the water flowing across the positive electrode 12 will produce small and numerous swirls to increase effectively an ozone generation efficiency.

EXAMPLE 2

A cylindrical or columnar shaft body 11 is made of Teflon resin having a structure of a diameter of 10 mm, a length of 90 mm and has a small (or reduced) diameter portions 11b having a diameter of 6 mm and a width of 10 mm at an interval of 20 mm and a groove 11c in a spiral configuration. The spiral groove 11c is a V-shaped groove having a depth of about 1.5 mm forming as a part of an equilateral triangle, and four grooves of such structure are provided. A positive electrode 12 is made of platinum net having 55 mesh of 20 mm and wound on a large diameter portion 10a. An ion exchange membrane 13 made of Naphion Membrane (No. 450, thickness of 0.15 mm, made by Du Pont) and a negative electrode 14 made of a platinum mesh as similar as the positive electrode 12 were used to form an ozonizer element 10. The thus formed ozonizer element 10 was placed in a tubular passage 20 of nylon resin having a thickness of 2 mm and an outer diameter of 20 mm, and a hold ring 21 of a nylon resin having an outer diameter of 16 mm, an inner diameter of about 11 mm and a width of 3 mm was disposed between an outer circumference of an upstream side of the ozonizer element 10 and the inner circumferential surface of the tubular passage 20. Each of the positive electrodes 12, 12, . . . and the negative electrode 14 were connected to an power source (not shown) through lead lines 15a, 15b, and DC power of 12V was applied therebetween, so that an electric current of about 0.7 Am per 1 cm$^2$ of the electrode was obtained during the passage of the water. When a water flow was controlled to be 1.0 liter per minute in the tubular passage 20, an ozone concentration of the water at the outlet was found to be 7 to 10 ppm. When the water flow is controlled to be 2.5 liter per minute, the ozone concentration of the ozone water was about 5 ppm, and when the water flow was 5.0 liter per minute, the ozone concentration was about 2.5 ppm. It was found that the ozone water having an ozone concentration of 5 ppm felt no ozone odor.

Now, further embodiments (fourth to sixth) of the present invention will be described with reference to the drawings, in which the ozonizer 10 constitute a substantial or main portion of the ozonizer of the inventing. The ozonizer 10 has at its central portion a cylindrical or columnar shaft body 11, on an outer surface of which there are provided, in turn, a positive electrode 12 of a platinum mesh plate, an ion exchange membrane 13 on the positive electrode 12, and a negative electrode 14 of a mesh plate on the ion exchange membrane 13 so that these layers 12, 13, 14 are closely wound or pressure-contacted with the adjacent ones.

In the illustrated embodiment, the columnar shaft body 11 is made of Teflon resin but other materials such as ceramics can be used as long as they have non-electric and anti-ozone characteristics. The positive electrode is made of a platinum mesh plate as known in the art, and it is generally understood that platinum has a catalyst function for enhancing efficiency of ozone generation.

Since the positive electrode 12 has a metal net or mesh plate structure of metal, it permits water not only to pass therethrough but also, if plates are superposed or laminated on both surfaces of the mesh plate and water is forced into the space between the laminated outer plates, the water will passes or flows in a complex manner through curved spaces by the strings of the mesh plate or net and passes in the planar direction of the mesh plate, which will be referred hereinafter to "planar direction" of the metal net or mesh plate. This flow of water will constitute a very complex stream of water and increase the degree or frequency of contact with ozone immediately after it is generated, and the generated ozone is immediately delivered to the other places to increase the efficiently of electrolytic process and ozone generation.

Further, in an electrolytic process by the use of the ion exchange membrane 13, an electrolytic action is most strongly effected the portion adjacent to the border between the portion where the electrodes are contacted with the ion exchange membrane 13 and the portion where the ion exchange membrane 13 is exposed to thereby provide a desirable generation of ozone. Thus, the use of the metal mesh plate increases the area or portions of the borders between the positive electrode 12 and the ion exchange membrane 13 and, therefore, it is understood to be the most desirable choice to use a mesh plate or net-like structure as the positive electrode.

As the ion exchange membrane 13 described above, Nafion membrane which is available in the market can be used, and this kind of ion exchange membrane 13 is solid but electrolytic, and the both electrolytic positive electrode 12 and the negative electrode 14 are piled on both surfaces of the ion exchange membrane 13 in layers. By this construction, these elements can be positioned nearer from each other and, consequently, a severe and hard electrolytic process (electrolyzing) at a lower voltage will be made possible.

In addition, as the negative electrode 14, a similar metal mesh plate is used in the embodiment of the invention and any materials will be used if they are anti-corrosive metals. It is known that platinum, gold, silver, etc. can be used for increasing ozone generation efficiency by their catalytic functions. If desired, platinum-plated titanium (Ti) mesh plate is practically preferred as being excellent in anti-corrosive properties and efficiency of ozone generation and, the platinum is not dissolved after a long time use and, therefore, it was found that this type of negative electrode can be used as similar as an electrode which is made substantially of platinum.

The positive electrode 12, the ion exchange membrane 13 and the negative electrode 14, each of which is known to be used as an element of an ozonizer, are wound, in turn, on the columnar shat body 11 in a pressure-contact configuration in the present invention. The columnar shaft body 11 may be of a simple cylindrical shape but, in the illustrated embodiment, a thin groove 11c is spirally formed from one end to the other so that water passed through the groove 11c.

Figure 4:
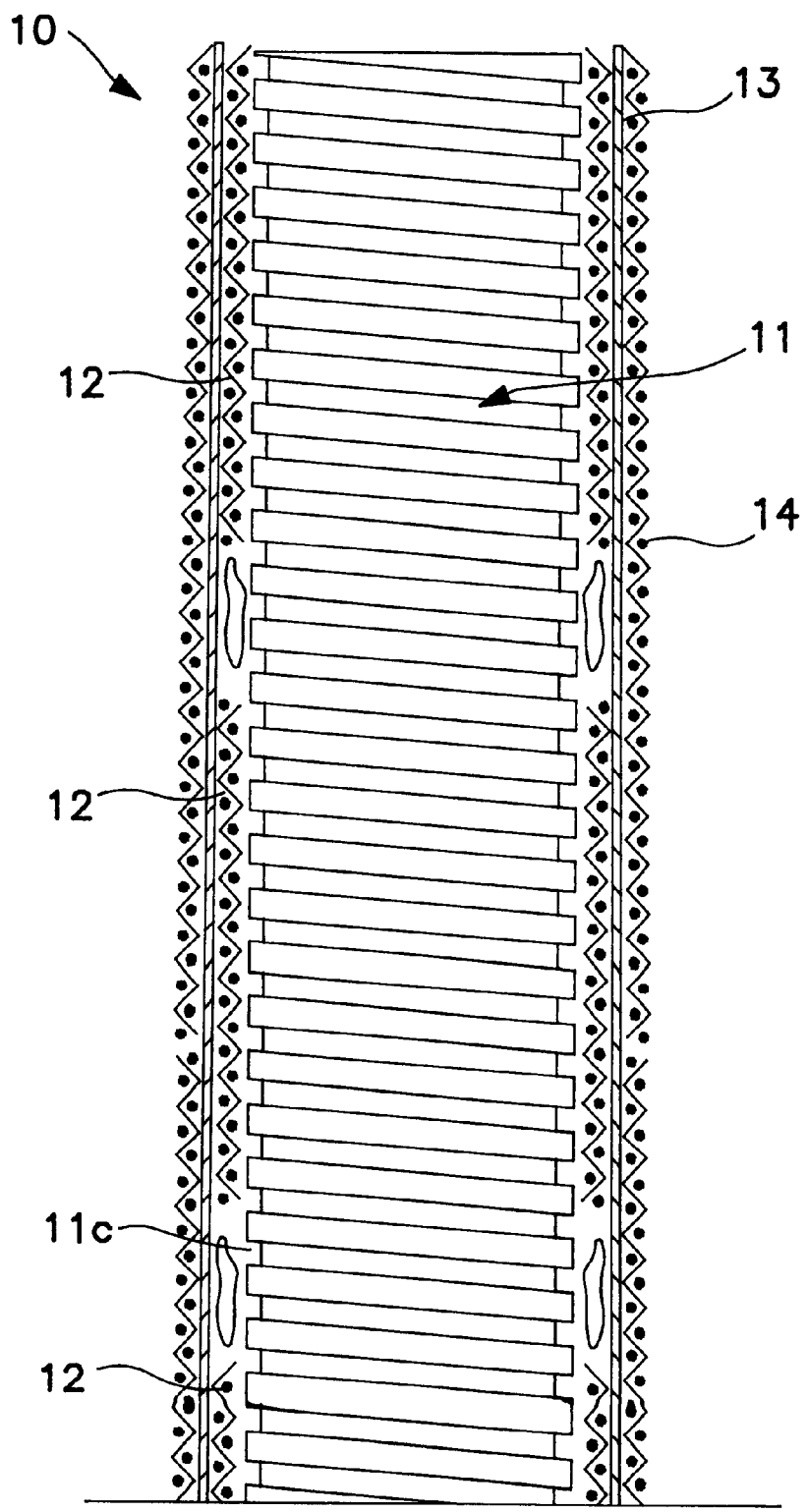
FIG. 4 is a longitudinally sectional view of an ozonizer element used for the ozonizer of the present invention.
Figure 5:
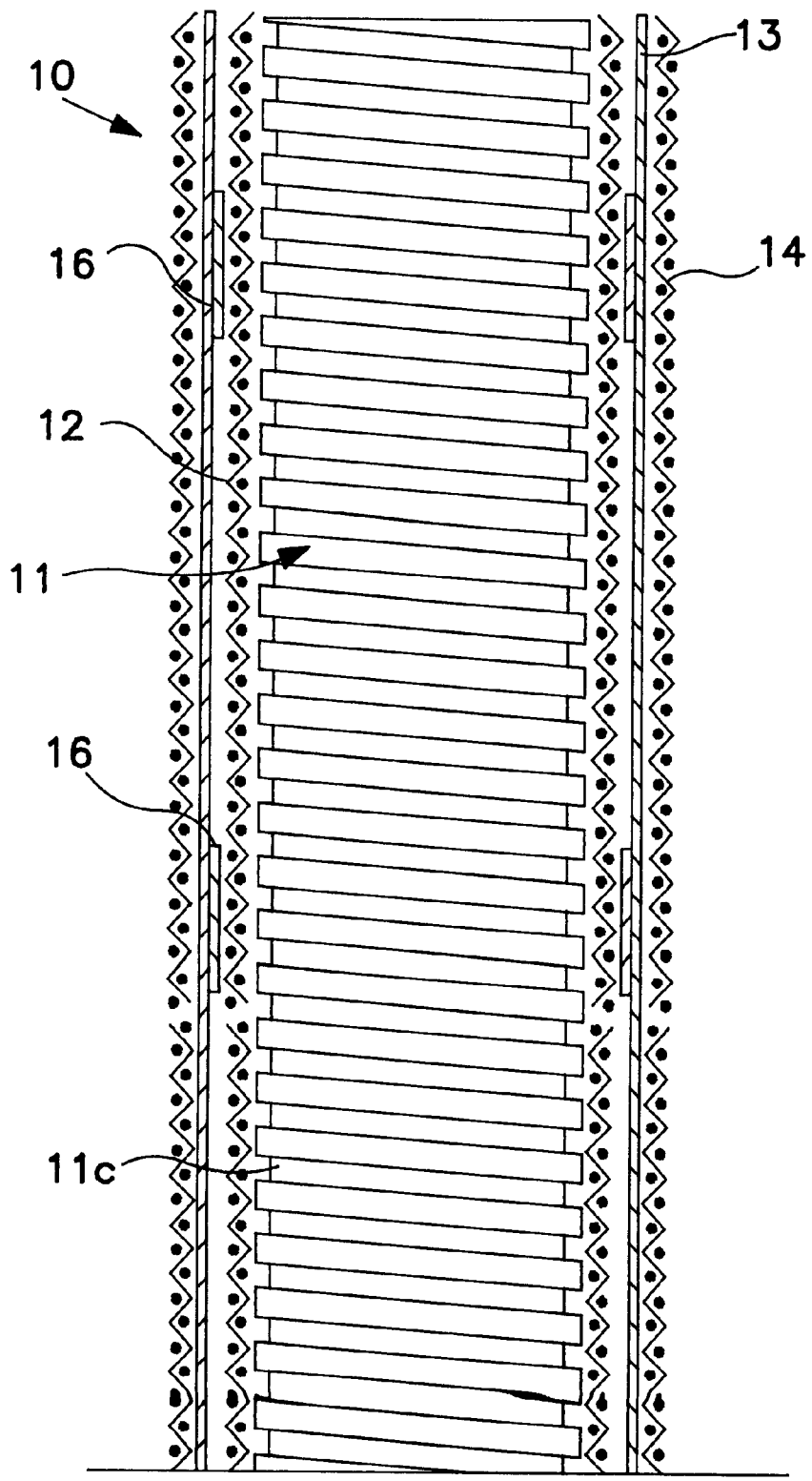
FIG. 5 is a longitudinally sectional view of an ozonizer element according to another embodiment of the invention.

Further, in the present invention, the positive electrode 12 is intermittently wound on the columnar shaft body 11 at a predetermined interval in the axial direction of the columnar shaft 11, or otherwise, an axially intermittent insulation is provided at a predetermined interval between the positive electrode and the negative electrode. In other words, in the present invention, the ozone element 10 is provided with in its axial direction (that is, in the axial direction of the columnar shaft body 11 in the embodiment) a discharge portion and non-discharge portion in an alternate fashion, and in the embodiment of FIG. 4, the positive electrode 12 is axially intermittently wound on the columnar shaft body 11. In the embodiment of FIG. 5, on the other hand, the positive electrode 12 is wound on the columnar shaft body 11 from one end to the other in an axially continuous manner, and an insulating tapes 16,16 . . . of a predetermined width are interposed between the positive electrode 12 and the ion exchange membrane 13 so that discharge portions and non-discharge portions are alternately positioned as similar as the embodiment of the invention.

The positive electrode 12, the ion exchange membrane 13, the negative electrode and the insulating tape 16 are previously formed in a tubular shape and then these elements can be placed, in turn, on the outer surface of the columnar shaft body 11 in a press-contact fashion. However, since each of these elements are flexible and resilient, each of these elements are prepared in a planar configuration and then wound on the columnar body 11 and, in this case, it is preferred that a starting end and a finishing end of each of the elements are not superposed, although a small superposition was found to be satisfactory without any remarkable reduction of efficiency.

As described above, the winding of the positive electrode 12, the ion exchange membrane 14, the negative electrode 14 and the insulating tape 16 in turn will provide a high grade of dimensional accuracy. The final winding layer of the negative electrode 14 are fixed at its both ends by a suitable method such as spot welding, blazing, suture, binding, knotting, etc.

Further, in the present invention, the ozonizer 10 is positioned in the tubular passage 20 through which water flows such that an axis of the ozonizer 10 lies on (or, in parallel with) the direction of the water flow, and DC power is applied between the positive electrode 12 and the negative electrode 14, so that the discharge portion and the non-discharge portion are alternately positioned in the flowing direction of the water. The tubular passage 20 is made of a non-conductive material as nylon and the like and has an inlet 22a at its one end and an outlet 22b at its other end so that the water from the inlet 22a flows through the tubular passage 20 and discharged out of the outlet 22b.

Since the ozonizer element 10 has a configuration that the columnar shaft body 11 is positioned such that its axis is aligned with, or in other word, in parallel with, the flowing direction of water, the water flowing through the columnar shaft body 11 will flow between the met shaped positive electrode 12 and the net shaped negative electrode 14 such the water flows over metal wires which constitute the nets of the electrodes 12, 14 and changes its directions in a complex way to run in the planar direction. Accordingly, at the side of the positive electrode 12, oxygen and ozone gas are generated by an electrolytic function and these gasses are entrained into small swirls of water and the ozone is immediately dissolved to water to become ozone water. The oxygen gas which is generated together with the ozone gas has lower solubility to water than the ozone gas (that is, ten times different in henry coefficient) and, therefore, a substantial amount of the oxygen gas is suspended in the water as non-soluble bubbles and directed toward the outlet 22b.

However, although it is true that ozone has a large solubility, ozone water flowing out of the outlet 22b smells an ozone odor because an dissolved ozone is partly suspended as small bubbles. Accordingly, if this unresolved ozone is fully dissolved, an efficiency can be improved more or less but its improvement degree is less than 1 per cent and, therefore, no improvement can be expected with respect to efficiency. However, if ozone gas is discharged to the place where the ozone water is used, the working environment will be deteriorated and therefore such a use must be avoided. An ozone gas, depending upon its volume, will be dangerous to human being if it is breathed in a human body to damage mucosa. Accordingly, if ozone water is used in a closed space such as a clean room, medical consultation room, it should be noted that such a small amount of unresolved ozone gas must be limited to enter such a closed space.

In order to restrict the ozone gas from entering, the present invention provides a structure that the discharge portion and non-discharge portion are alternately provided alternately in the columnar shaft body 11 so that an ozone generation portion and an agitating portion are alternately provided. In other words, as water passes through the ozonizer element, it contacts the ozone at the discharge portion and is agitated sufficiently at the non-discharge portion so that, in the present invention, these steps are repeated to thereby restrict invasion or entering of the unresolved ozone.

On the other hand, on the side of he negative electrode 14, hydrogen gas is generated by an electrolytic process and directed in the form of bubbles to the outlet 22b. Water passing through the positive electrode 12 and water passing through the negative electrode are mixed with each other at the downstream of the ozonizer element 10. However, it is understood that hydrogen generated on the side of the negative electrode 14 in the form of a gaseous phase is not reactive to ozone water, which is generated by dissolving ozone.

In the fifth aspect of the invention, as defined in claim 5, the columnar shaft body 11 has a large diameter portion 11a and a small diameter portion 11b in an alternate fashion in an axial direction, and a thin spiral groove 11c is provide on the large diameter portions 11a, 11a, . . . , of the columnar shaft body 11 from one end to the other thereof, and the positive electrodes 12 are wound on the large diameter portions 11a, the ion exchange membrane 13 is press-contacted on the positive electrodes 12, 12, . . . , and further the negative electrode 14 is on the outer surface of the ion exchange membrane 13, so that a predetermined ozonizer element 10 is formed.

Figure 6:
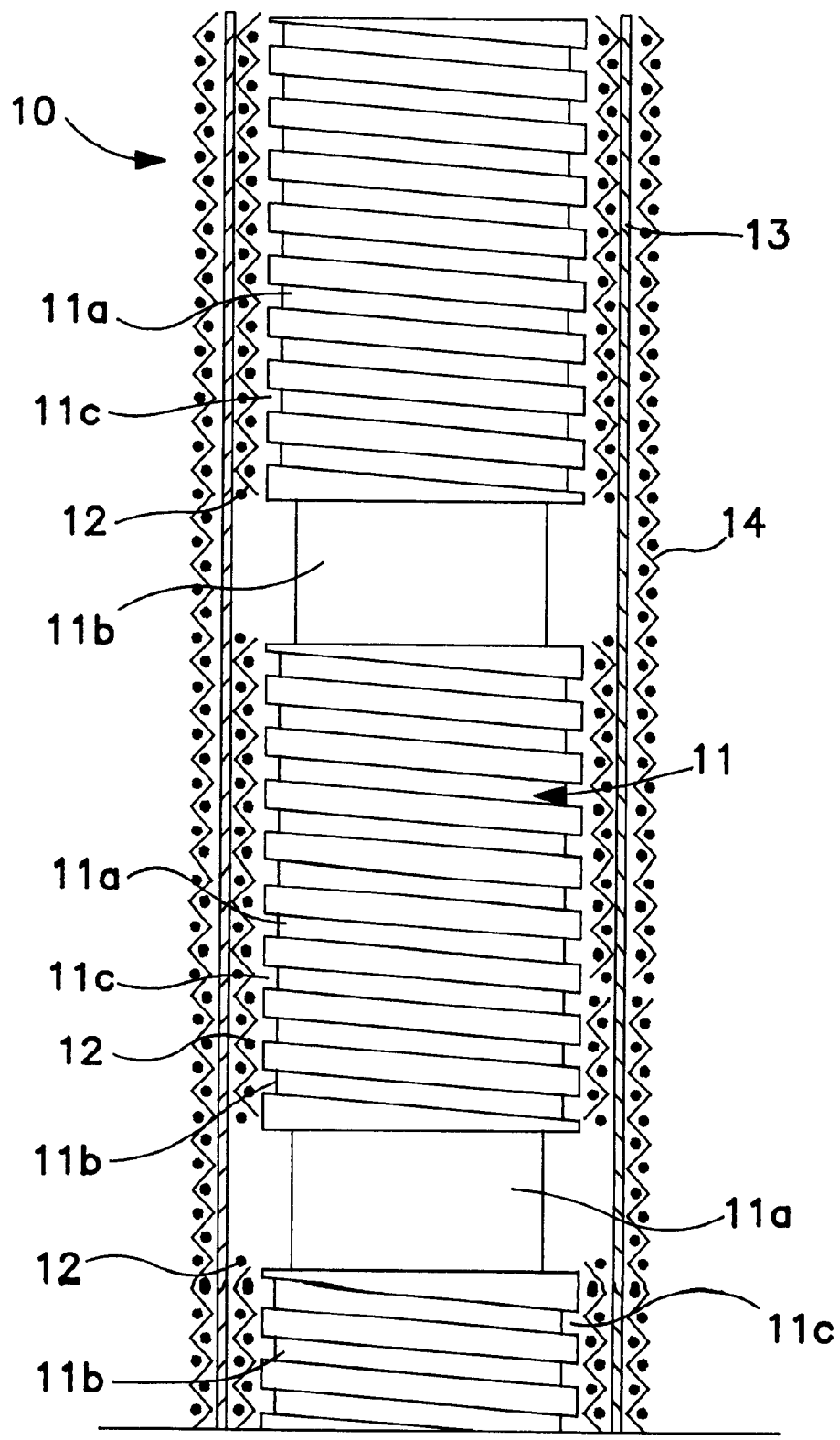
FIG. 6 is a longitudinally sectional view of an ozonizer element according to a further embodiment of the invention.
Figure 7:
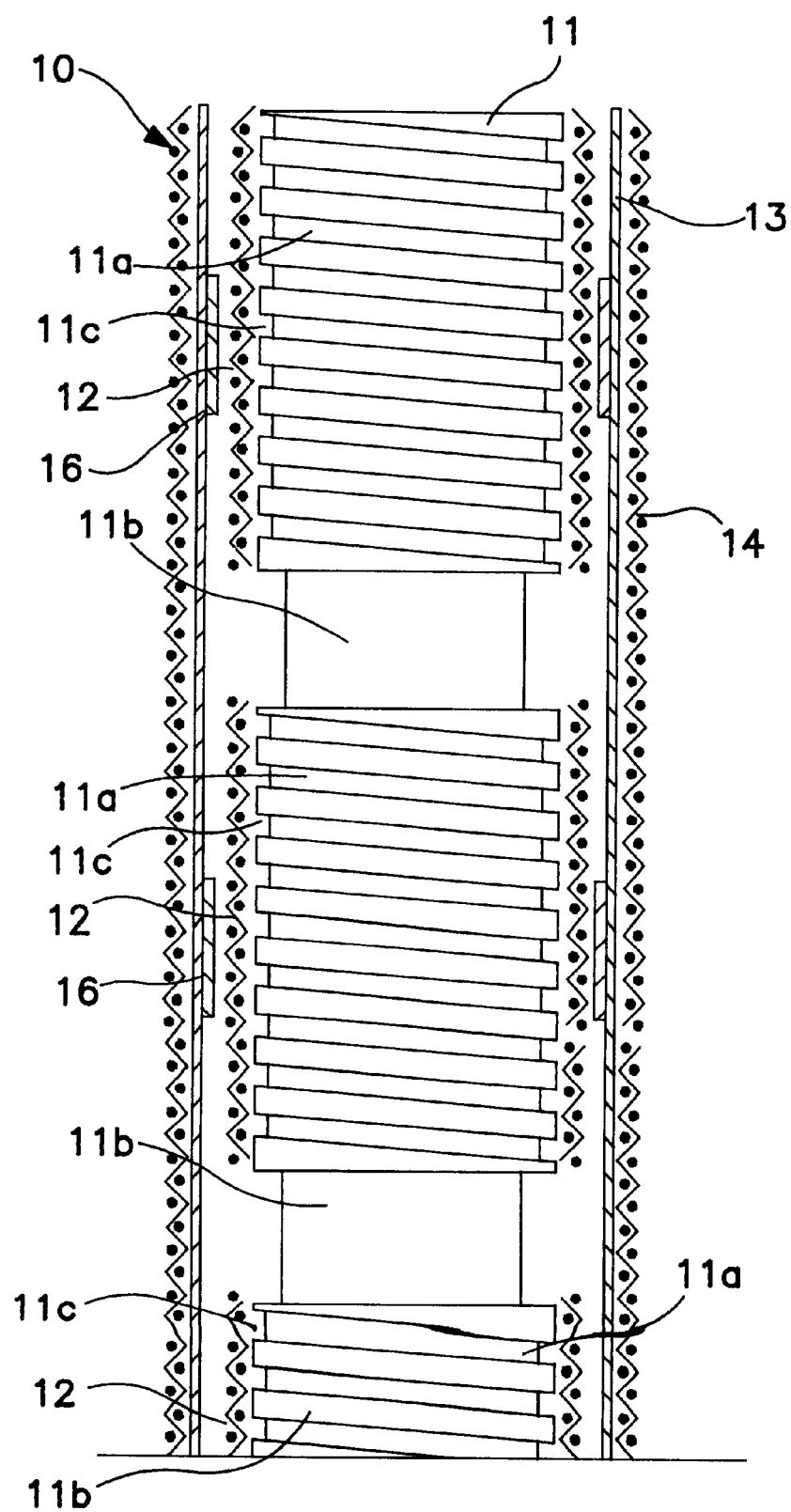
FIG. 7 is a longitudinally sectional view of an ozonizer element according to another embodiment of the invention.

In the present invention, as shown in FIGS. 6 and 7, a diameter is intermittently reduced so that reduced diameter portions and large diameter portions are formed alternately in the axial direction of the columnar shaft body 11. The large diameter portions 11a serve as discharge portions and the small diameter portions 11b serve enlarge locally a sectional surface for passing water to enhance generation of swirls in accordance with change of passage area of water, so that an efficiency of mixing is increased.

In this fifth aspect of the invention (defined in claim 5), as similar as the fourth aspect (claim 4), an axis of the columnar shaft body is directed to the same direction of the water flowing direction, and DC voltage is applied between the positive electrode 12 and the negative electrode 14 so that the discharge portions and the non-discharge portions are alternately positioned in the flowing direction of water.

In the sixth aspect of the invention as defined in claim 6, the columnar shaft body 11 has large diameter portions 11a and small diameter portions 11b in an alternate fashion in an axial direction, and a thin spiral groove 11c is provide on the large diameter portions 11a, 11a, . . . , of the columnar shaft body 11 from one end to the other thereof, and the positive electrodes 12 are wound on the large diameter portions 11a, the ion exchange membrane 13 is press-contacted on the positive electrodes 12, 12, . . . , and further the negative electrode 14 is on the outer surface of the ion exchange membrane 13, so that a predetermined ozonizer element 10 is formed. This is same as the second aspect (defined in claim 2) of the invention.

In the present invention, the ozonizer element 10 is positioned in the tubular passage 20 such that an outer surface of the positive electrode 12 is contacted with an inner surface of the tubular passage 20, or alternatively, the ozonizer element 10 is concentrically held by the holding ring 21 which is disposed at an upstream of the tubular passage 20 between the negative electrode 14 and the tubular passage 20.

Therefore, on the side of the positive electrodes 12, water flows in a planar direction of the positive electrode 12 and also through the groove 11c. By contrast, on the side of the negative electrode, water flows only in the planar direction and, therefore, more water runs on the side of the positive electrodes 12, although it depends upon a sectional area of the groove 11c. Thus, by letting the water flow much more on the side of the positive electrode where ozone is generated, this structure can improve efficiency.

As similar as the fourth and fifth aspects of the invention, DC voltage is applied between the positive electrode 12 and the negative electrode 14 so that discharge portions and non-discharge portions are alternately positioned in the flowing direction of the water.

In the present invention, if it is required to increase a volume of the ozone generation, it is desirable that a plurality of ozonizers are simply provided to a header in a parallel manner, and if an ozone concentration is to be increased, it is satisfied by merely providing the ozonizers coupled in a serial manner. In this connection, when two ozonizers in the specific example in the preferred embodiment of the invention were coupled in series, it was found that ozone concentration of the ozone water was 10+α(ppm) at a water flow rate of 2.5 liter per minute. Since a saturation concentration of ozone is 18 ppm at the condition of 20° C. and 1 atmospheric pressure, in case of the serial connection as described above, connection of two–four ozonizers would be a practically applicable range.

As described above, in the present invention, the ozonizer element 10 is composed of a tubular shaft body 11, a positive electrode 12 of a platinum mesh plate wound on the tubular shaft body 11, an ion exchange membrane 13 wound on the positive electrode 12, and a negative electrode 14 wound on the ion exchange membrane 13 such that the layers of these elements are press-contacted with the adjacent ones.

Therefore, a desired ozonizer, which is simple and meets with the requirements of dimensional accuracy, can be obtained easily.

Further, since the discharge portions and the non-discharge portions are alternately provided in the ozonizer element, the ozonizer of the present invention can restrict or prevent entering of non-dissolved ozone. In order to examine advantages and effects of the present invention relative to the conventional method of generation according to the prior art ozonizers, the inventors conducted experiments. As examples of the conventional prior arts, for comparison with the present invention, a gas solubility method in which a high concentration ozone gas is dissolved by aeration in the water, and a planar type ozone water electrolytic generation method which has recently been popularized in the art. In the first mentioned conventional gas solubility method, oxygen in the atmosphere was concentrated to abut 90% by means of a PSA oxygen concentration device, and an ozone gas of about 20,000 ppm was generated by a ceramic ozonizer of a creeping discharge method and then the generated ozone gas was blown into the water to obtain ozone water of about 5 ppm. On the other hand, in the planar type ozone water electrolytic method, a platinum positive electrode having an electrode area of 30 cm$^2$ and an electrode made of the aforementioned Nafion 450 membrane are used and soft water is supplied to obtain ozone water of about 5 ppm. Further, in this method, ozone water of 5 ppm was obtained by using the elements, which are same as those of the aforementioned embodiment.

In order to proceed measurements of concentration of the ozone gas diffused from the ozone water obtained by each of the conventional and inventive methods described above, ozone water of each method was poured into a one-liter volume glass beakers, and suction port of Kitagawa gas detection pipe is disposed to a position which is 50 mm above the water level and a gas concentration was detected by the detection pipe method. As a result, in the gas dissolution method, diffusion gas concentration was raised up to 15–17 ppm at a water temperature of 20° C., and in the planar type ozone water electrolytic method, diffusion gas concentration was 3–4 ppm, and in the present invention, it was less than 0.1 ppm that is the lowest graduation of the detection pipe sensitivity. As described above, the experiments have proved remarkable advantages and effects that are obtained by the present invention.

What is claimed is:

1. An ozonizer comprising:
   (1) an ozonizer element, the ozonizer element having:
      a columnar shaft body,
      a positive electrode of a platinum net pressure-wound around an outer surface of the columnar shaft body,
      an ion exchange membrane pressure-wound around the positive electrode,
      a negative electrode of a metal net pressure-wound around the ion exchange membrane,
      wherein the positive electrode is wound around the columnar shaft body to thereby form the ozonizer element,
   (2) a tubular passage for permitting water to flow therethrough and housing therein the ozonizer element in such a manner that an axis of the ozonizer lies in a flowing direction of the water, and
   (3) means for applying DC electric voltage between the positive electrode and the negative electrode so that a discharge portion and non-discharge portion are alternately disposed in the flowing direction of the water.

2. An ozonizer comprising:
   (1) an ozonizer element, the ozonizer element having:
      a columnar shaft body having a thin groove extending from one end thereof to the other end,
      a positive electrode of a platinum net plate pressure-wound around an outer surface of the columnar shaft body,
      an ion exchange membrane pressure-wound around the positive electrode,
      a negative electrode of a metal net pressure-wound around the ion exchange membrane to thereby form the ozonizer element,
   (2) a tubular passage for permitting water to flow therethrough and housing therein the ozonizer element in such a manner that an outer surface of the positive electrode is contacted with an inner surface of the tubular passage, or otherwise, in such a manner that the ozonizer element is concentrically suspended between the negative electrode and the tubular passage by means of a holding ring disposed at an upstream of the tubular passage, and
   (3) means for applying DC electric voltage between the positive electrode and the negative electrode.

3. An ozonizer comprising:
   (1) an ozonizer element, the ozonizer element having:
      a columnar shaft body having a thin spiral groove extending longitudinally from one end thereof to the other end, and a linear thin groove extending longitudinally from one end thereof to the other end,
      a positive electrode of a platinum net plate pressure-wound around an outer surface of the columnar shaft body,
      an ion exchange membrane pressure-wound around the positive electrode,
      a negative electrode of a metal net pressure-wound around the ion exchange membrane to thereby form the ozonizer element,
   (2) a tubular passage for permitting water to flow therethrough and housing therein the ozonizer element in such a manner that an outer surface of the positive electrode is contacted with an inner surface of the tubular passage, or otherwise, in such a manner that the ozonizer element is concentrically suspended between the negative electrode and the tubular passage by means of a holding ring disposed at an upstream of the tubular passage, and
   (3) means for applying DC electric voltage between the positive electrode and the negative electrode.

4. An ozonizer comprising:
   (1) an ozonizer element, the ozonizer element having:
      a columnar shaft body,
      a positive electrode of a platinum net pressure-wounded around an outer surface of the columnar shaft body,
      an ion exchange membrane pressure-wounded around the positive electrode,
      a negative electrode of a metal net pressure-wounded around the ion exchange membrane,
      wherein the positive electrode is intermittently wounded around the columnar shaft body with a predetermined axial interval or otherwise an intermittent insulation is provided in an axial direction between the positive electrode and the negative electrode to thereby form the ozonizer element,-

(2) a tubular passage for permitting water to flow therethrough and housing therein the ozonizer element in such a manner that an axis of the ozonizer lies in a flowing direction of the water, and (3) means for applying DC electric voltage between the positive electrode and the negative electrode so that a discharge portion and non-discharge portion are alternately disposed in the flowing direction of the water.

5. An ozonizer comprising a columnar shaft body having large diameter portions and small diameter portions in an alternate configuration, and a thin spiral groove on the large diameter portions so that the thin spiral groove extends in a lengthwise direction from one end to the other, wherein, a positive electrode is wound on the large diameter portion of the columnar shaft body and further an ion exchange membrane is wound on an outer surface of the positive electrode, and a negative electrode of a metal net structure is wound on a surface of the thus formed ion exchange membrane, so that each of the wound layers is pressure-contacted to the adjacent ones to form an ozonizer element, and wherein the ozonizer element is placed in a tubular passage such that an axis is located in a flowing direction of water, and a DC electric voltage is applied between the positive electrode and the negative electrode so that discharge portions and the non-discharge portions are positioned alternately in the flowing direction of the water.

6. An ozonizer comprising:

a columnar shaft body having large diameter portions and small diameter portions alternately in an axial direction of the columnar haft body, and a spiral thin groove on a surface of the large diameter portions so that the spiral thin groove extends longitudinally from one side of the columnar shaft body to the other side, wherein positive electrodes are wound on the large diameter portions and an ion exchange membrane is wound on an outer surface of the positive electrodes, and a metal negative electrode is wound on an outer surface of the ion exchange membrane such that these elements in layers are pressure-contacted with the adjacent ones to thereby form an ozonizer element, and wherein the ozonizer element is housed in a tubular passage so that water passes through the ozonizer element and in the tubular passage, and the ozonizer element is disposed such that the outer surface of the positive electrode is contacted with an inner surface of the tubular passage, or otherwise, the ozonizer element is concentrically held by a holder ring disposed at an upstream portion of the tubular passage between the negative electrode and the tubular passage, and wherein DC electric voltage is applied between the positive electrodes and the negative electrode so that discharge portions and non-discharge portions are located alternately in a flowing direction of the water.

* * * * *